Oct. 30, 1962 J. M. GORDON 3,061,803

COAXIAL TUNING DEVICE

Filed Dec. 22, 1961

JOHN MARVIN GORDON
INVENTOR.

BY George C. Thompson
Gerald Grigg
AGENTS

United States Patent Office 3,061,803

Patented Oct. 30, 1962

3,061,803

COAXIAL TUNING DEVICE

John Marvin Gordon, Los Angeles, Calif., assignor to Space Technology Laboratories, Inc., Los Angeles, Calif., a corporation of Delaware Filed Dec. 22, 1961, Ser. No. 161,574
7 Claims. (Cl. 333—82)

This invention relates generally to microwave tuning devices and more particularly to an improved arrangement for tuning coaxial lines.

In the prior art the tuning of a coaxial line usually required a movable tuning slug in frictional contact with the center conductor. The movable tuning slug was moved by utilizing large head locking screws adapted to pass through an elongated slot in the outer conductor and into the tuning slug so as to maintain and hold the tuning slug in a preferred position. These devices are fairly cumbersome and difficult to adjust due to the lack of control over the slug position and the subsequent movement or disturbance of the preferred position by the locking action of the locking screws. As a result the tuning procedure is time consuming and at best a frustrating experience.

In this invention the movement and locking of the tuning slug is occasioned by a micrometer type handle. In the preferred embodiment the outer wall of the coaxial cable contains a pair of elongated slots. The tuning slug is arranged to frictionally engage the inner conductor and the inside wall of the outer conductor in a conventional manner. Located at one end of the tuning slug is a pair of end slots each adapted to receive a threaded lug in a nesting relationship. The threaded lugs are arranged to fit snugly in the end slots of the tuning slug and in such a manner as to expose the threaded portion for engagement with the internal threads of the micrometer handle. When assembled, the tuning slug is inserted within the outer conductor of the coaxial assembly so as to align the end slots in the tuning slug with the elongated slots in the outer conductor of the coaxial line. In this position, the threaded lugs are inserted and the micrometer handle threaded in position so as to threadably engage each of the threaded lugs. The micrometer handle is prevented from moving in either a forward or rearward direction by means of mechanical stops. Turning the handle, therefore, causes a resulting linear motion to be imparted from the inside threads of the handle to the threaded lugs and thence to the tuning slug. The direction of rotation of the handle will therefore determine the direction of movement of the tuning slug. In this manner the elongated slots in the outer conductor of the coaxial cable are always covered and thereby shielded. Due to the large number of threads per inch used and the mechanical advantage obtained by such use, it is not necessary to lock the handle after an adjustment is made.

Figure 1:
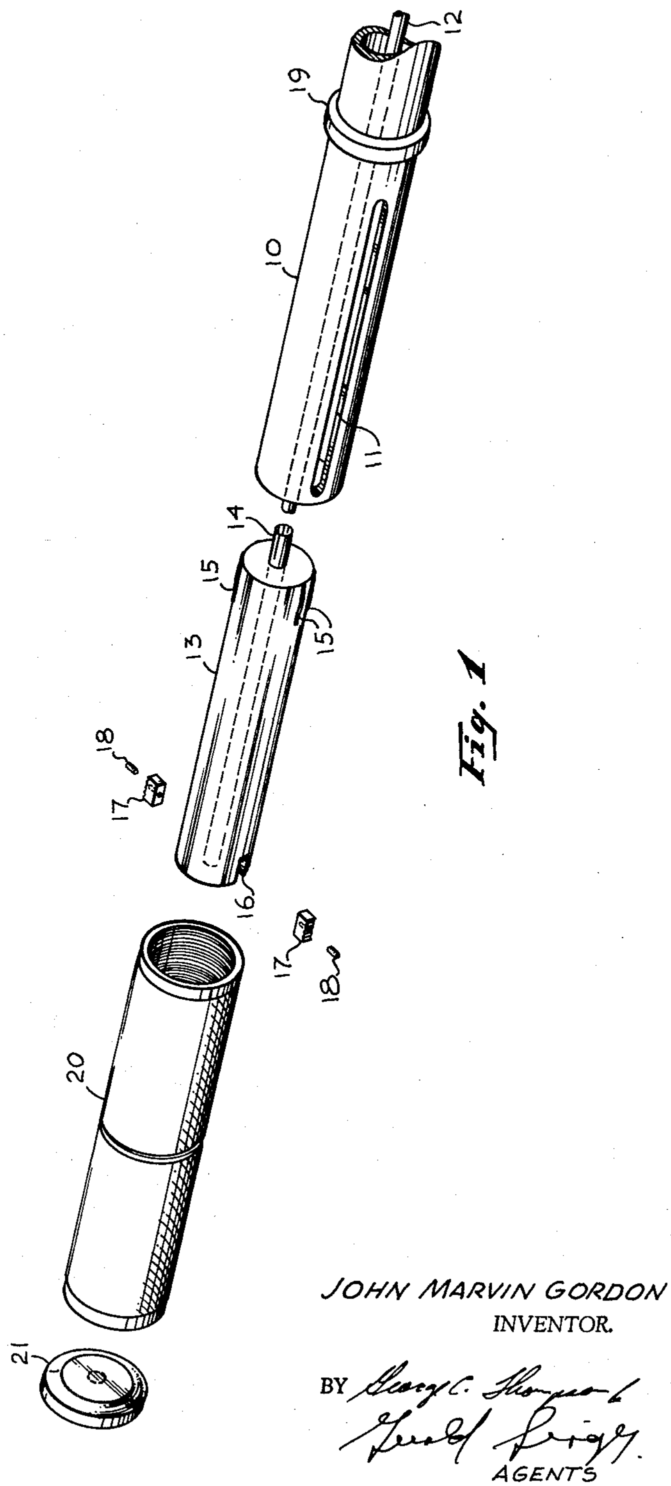
Figure 2:
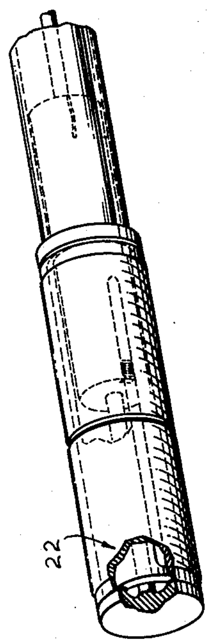

Further objects and advantages of this invention will be made more apparent by referring now to the accompanying drawings wherein:

FIGURE 1 is an exploded view illustrating the individual components comprising the invention, and FIGURE 2 illustrates the invention completely assembled.

Referring now to FIGURE 1, there is shown an exploded view of a coaxial tuning device comprising an outer conductor 10 forming part of a coaxial line. Located on the periphery of the walls forming the outer conductor 10 is a pair of elongated slots 11. An inner conductor 12 is centrally located within the outer conductor 10 in a conventional manner to thereby define the coaxial line. Tuning of the coaxial line is accomplished by inserting a tuning slug 13 into the coaxial line in such a manner as to electrically connect the inside wall of the outer conductor 10 with the outside wall of the inner conductor 12. The central longitudinal portion of the tuning slug 13 is hollow in order to accept the inner conductor 12. Frictional contact betwen the tuning slug 13 and the inner conductor 12 is improved by means of friction fingers 14 which are electrically attached to the main body of the tuning slug 13 and arranged to engage the inner conductor 12. Electrical contact with the inside wall of the outer conductor 10 is achieved by means of friction slides 15 which are electrically attached to the periphery of tuning slug 13 and caused to frictionally contact the inside wall of the outer conductor. Tuning of the coaxial line is accomplished by moving the tuning slug 13 and changing the location of the point at which the outer conductor 10 is electrically shorted or connected to the inner conductor 12. Located on the tuning slug and preferredly on opposing sides is a pair of slots 16 each adapted to receive and hold a threaded lug 17. Each lug 17 is threaded on one side only and formed so as to fit snugly within the slot 16, the lugs 17 being held in place by means of set screws 18.

The tuner is assembled by sliding the tuning slug 13 into the coaxial cable in such a manner that the inner conductor 12 fits wholly within the tuning slug when fully inserted. The tuning slug 13 is rotatably aligned until the slots 16 are located directly under the elongated slots 11. In this position, the lugs 17 are inserted through the elongated slots 11 and into slots 16 on the tuning slug 13. Set screws 18 are inserted to lock the lugs 17 onto the tuning slug 13 and do not project or interfere with the elongated slots 11. The height of the lugs 17 is sufficient to allow the threaded portion to extend above the outside diameter of the outer conductor.

A micrometer type handle 20 is internally threaded and rotated over the threads on the lugs 17. When completely assembled the handle 20 is prevented from moving in a forward direction by means of a mechanical stop such as a ring 19 attached to the outer conductor 10. The location of the ring 19 is usually determined by the length of the handle 20. In the preferred embodiment the location of ring 19 allows the handle 20 to completely cover the elongated slots 11 thereby allowing a small portion of the outer conductor 10 and the inner conductor 12 to extend beyond the handle 20. Rearward movement of the handle 20 is prevented by means of a cover 21 which is electrically and mechanically connected to the periphery of the outer conductor 10 and to the inner conductor 12. The cover 21 therefore serves the dual purpose of limiting the rearward movement of the handle 18 and also of completely shielding the tuning action.

Referring now to FIGURE 2, there is shown a completely assembled coaxial tuning system as illustrated in FIGURE 1. A cutaway portion 22 illustrates more clearly how the cover 21 is attached to the inner conductor 12 and the outer conductor 10. In operation the handle 20 is rotated for changing the position of the tuning slug 13. Since the tuning handle 20 is prevented from moving in a forward direction by means of the ring 19 and in a rearward direction by means of the cover 20, a force is imparted from the internal threads of the rotating handle 20 to the threaded portions of the lugs 17. The lugs 17 are fixedly attached to the movable tuning slug 13 thereby causing movement in the tuning slug 13. By utilizing a large number of threads per inch a locking device has been found unnecessary.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination, a coaxial line having an inner conductor and an outer conductor, tuning means for tuning said coaxial line by electrically shorting said inner conductor to said outer conductor, said outer conductor having a longitudinal opening for exposing a portion of said tuning means, a threaded lug attached to said tuning means and adapted to move in said opening, and an internally threaded handle enclosing said outer conductor and restrained for rotational movement only, said internal threads on said handle engaging said threads on said lug for moving said tuning means as said handle is rotated.

2. In combination, a coaxial line having an inner conductor and an outer conductor, a movable shorting slug electrically connecting said inner conductor with said outer conductor, said outer conductor having a longitudinal opening for exposing a portion of said shorting slug, a threaded lug attached to said shorting slug and adapted to move in said opening, and an internally threaded handle enclosing said outer conductor and restrained for rotational movement only, said internal threads on said handle engaging said threads on said lug for moving said shorting slug as said handle is rotated.

3. In combination, a coaxial line having an inner conductor and an outer conductor, a movable shorting slug electrically connecting said inner conductor with said outer conductor, said shorting slug having a longitudinal opening for frictionally engaging said inner conductor, said outer conductor having a longitudinal opening for exposing a portion of said shorting slug, a threaded lug attached to said shorting slug and adapted to move in said opening, and an internally threaded handle enclosing said outer conductor and restrained for rotational movement only, said internal threads on said handle engaging said threads on said lug for moving said shorting slugs as said handle is rotated.

4. In combination, a coaxial line having an inner conductor and an outer conductor, tuning means for tuning said coaxial line by electrically shorting said inner conductor to said outer conductor, said outer conductor having a longitudinal opening for exposing a portion of said tuning means, the length of said longitudinal opening being determined by said tuning means, a threaded lug attached to said tuning means and adapted to move in said opening, and an internally threaded handle enclosing said outer conductor and restrained for rotational movement only, said internal threads on said handle engaging said threads on said lug for moving said tuning means as said handle is rotated.

5. In combination, a coaxial line having an inner conductor and an outer conductor, tuning means for tuning said coaxial line by electrically shorting said inner conductor to said outer conductor, said outer conductor having a longitudinal opening for exposing a portion of said tuning means, said tuning means having a recess thereon, a threaded lug nesting within said recess and adapted to move in said opening, said lug having threads projecting above said opening, and an internally threaded handle enclosing said outer conductor and restrained for rotational movement only, said internal threads on said handle engaging said threads on said lug for moving said tuning means as said handle is rotated.

6. In combination, a coaxial line having an inner conductor and an outer conductor, a movable shorting slug electrically connecting said inner conductor with said outer conductor, said outer conductor having a longitudinal opening for exposing a portion of said shorting slug, said shorting slug having at least one recess thereon, a threaded lug nesting within each of said recesses and adapted to move in said opening, said lug having threads projecting above said opening, and an internally threaded handle enclosing said outer conductor and restrained for rotational movement only, said internal threads on said handle engaging said threads on said lug for longitudinally moving said shorting slug as said handle is rotated.

7. In combination, a coaxial line having an inner conductor and an outer conductor, tuning means for tuning said coaxial line by electrically shorting said inner conductor to said outer conductor, said outer conductor having a longitudinal opening for exposing a portion of said tuning means, a threaded lug attached to said tuning means and adapted to move in said opening, an internally threaded handle enclosing said outer conductor and engaging said threads on said lug, a shoulder formed on the outside periphery of said outer conductor for limiting the forward movement of said handle, and a cover plate attached to the end portion of said outer conductor and said inner conductor for limiting the rearward movement of said handle thereby causing said tuning means to move in a longitudinal direction as said handle is rotated.

No references cited.